Feb. 25, 1958
N. F. MARZOLF
2,824,318
EGG WASHING AND DRYING MACHINE
Filed Jan. 2, 1952
4 Sheets-Sheet 1
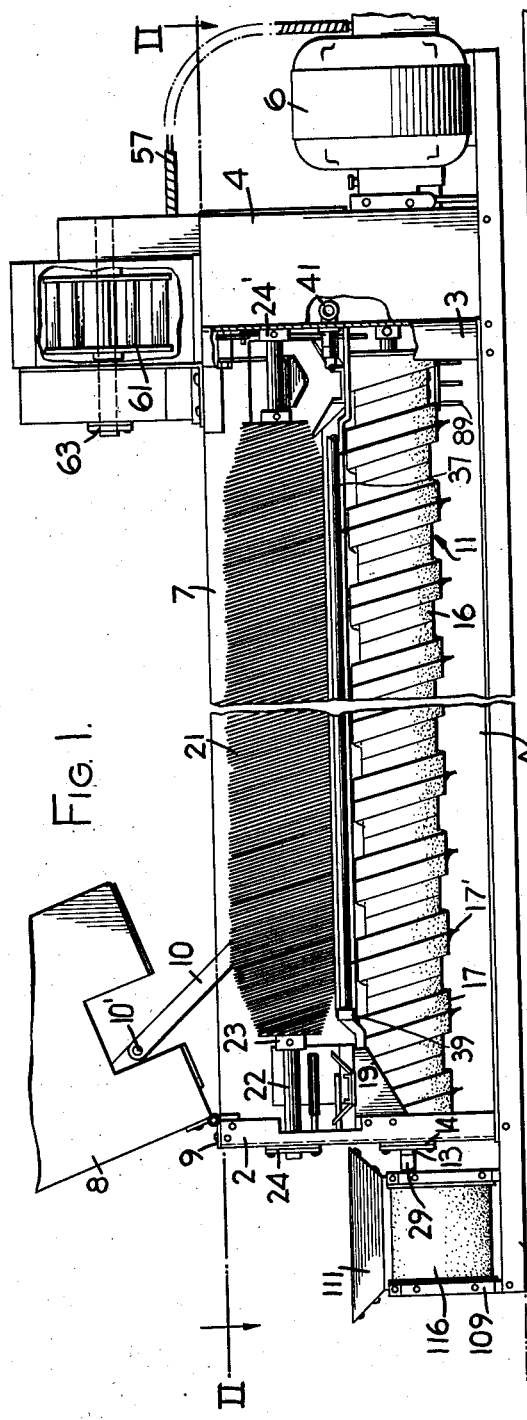
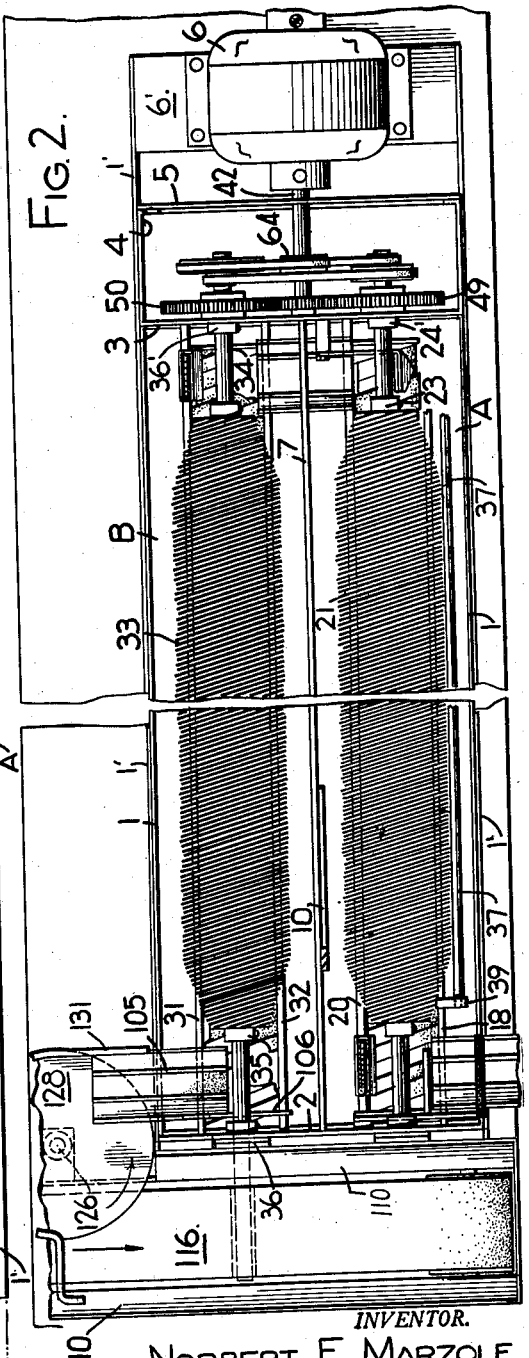
INVENTOR.
NORBERT F. MARZOLF
BY
Bean, Brooks, Buckley & Bean.
ATTORNEYS

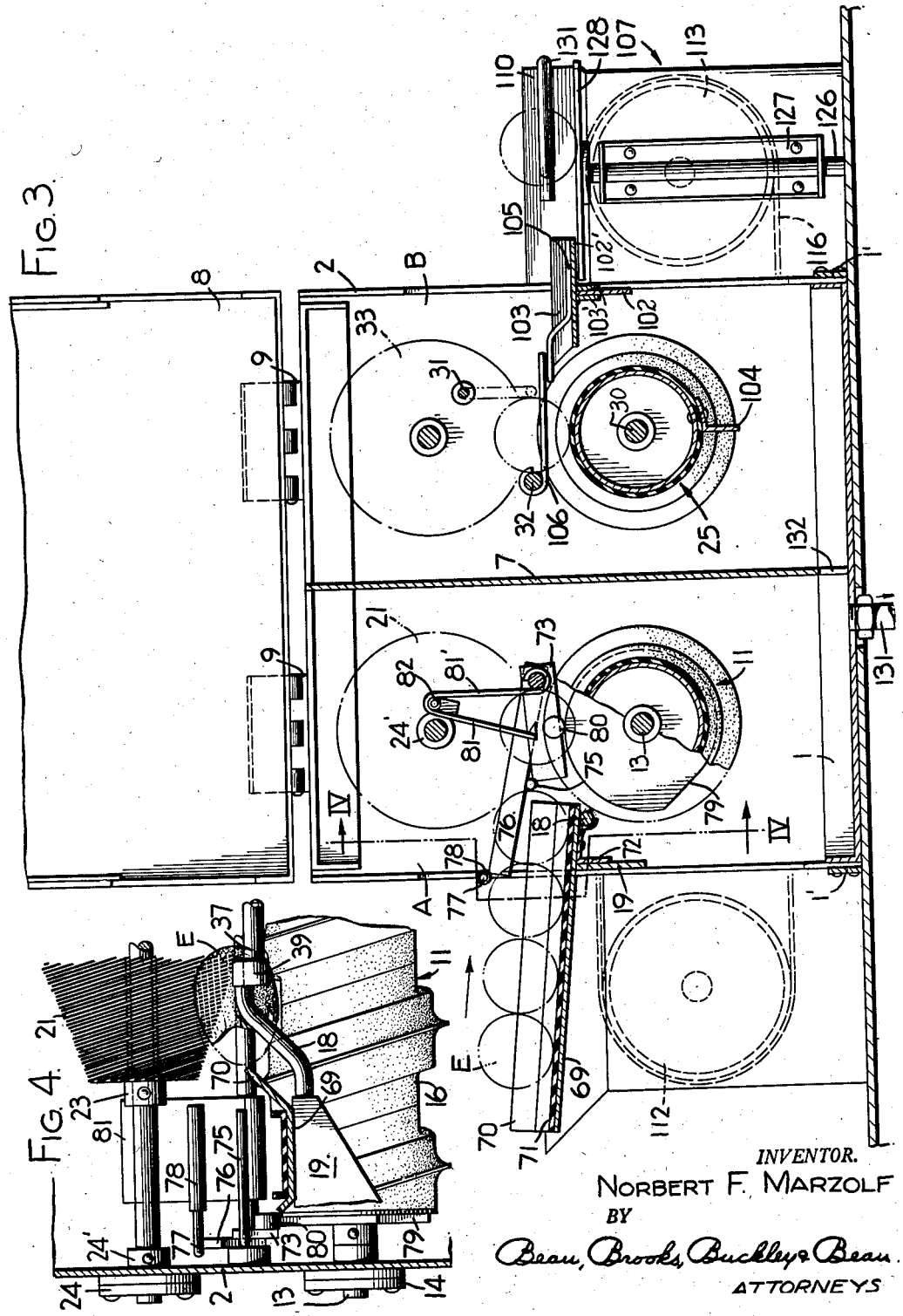

Feb. 25, 1958 N. F. MARZOLF 2,824,318
EGG WASHING AND DRYING MACHINE
Filed Jan. 2, 1952 4 Sheets-Sheet 3
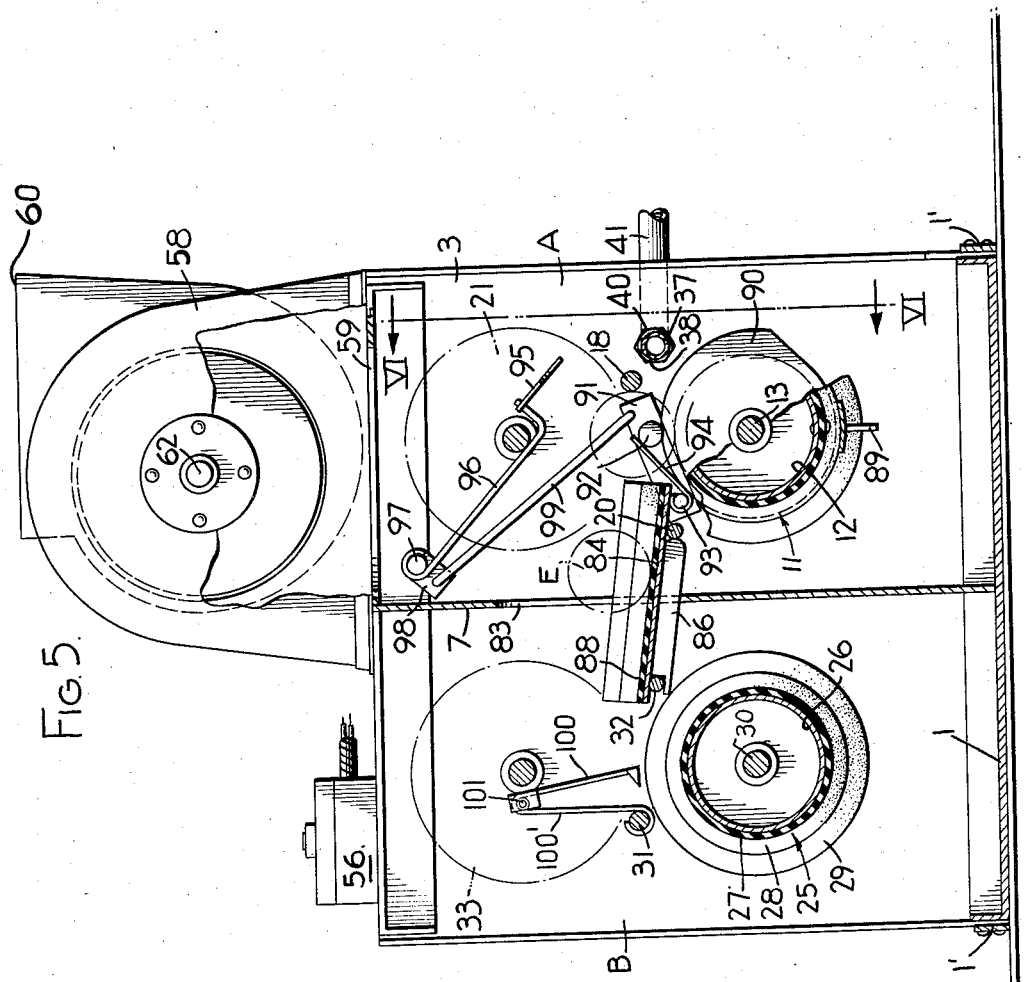
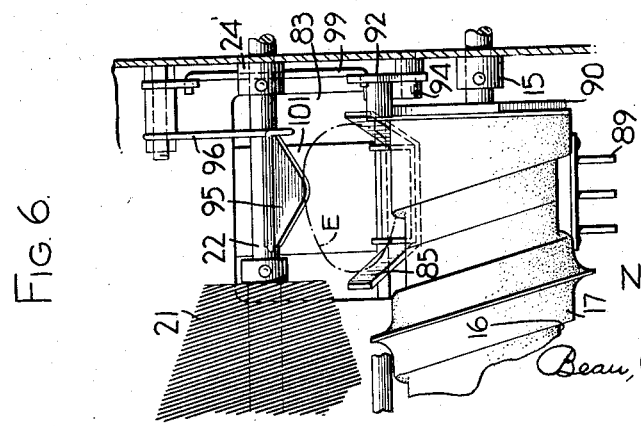
INVENTOR.
NORBERT F. MARZOLF
BY
Bean, Brooks, Buckley & Bean
ATTORNEYS Feb. 25, 1958 N. F. MARZOLF 2,824,318
EGG WASHING AND DRYING MACHINE
Filed Jan. 2, 1952 4 Sheets-Sheet 4

INVENTOR.
Norbert F. Marzolf
BY
Bean, Brooks, Buckley & Bean
ATTORNEYS

United States Patent Office 2,824,318
Patented Feb. 25, 1958

2,824,318

EGG WASHING AND DRYING MACHINE

Norbert F. Marzolf, Strykersville, N. Y., assignor to Marzolf Manufacturing Company, Strykersville, N. Y., a partnership Application January 2, 1952, Serial No. 264,541

11 Claims. (Cl. 15—3.13)

This invention relates to an egg cleaning machine, and more particularly an egg washing and drying machine.

The problem of providing suitable means for cleaning eggs is of considerable magnitude when the egg handling enterprise is of any size and extent. Washing and drying eggs by hand operation is extremely unsatisfactory where there is a relatively large number of eggs to be cleaned, since it is a laborious and time consuming procedure. Also, hand washing and drying is by no means preferable insofar as breakage is concerned. Various machines have been developed from time to time for the purpose of cleaning eggs, but such prior art machines have proved unsatisfactory in several respects. Some of them are relatively complicated and cumbersome, and do not properly or completely clean the eggs. Others do not properly dry the eggs, thus permitting the washing fluid to seep through the shell of the egg and spoil the same. Still others have proved unsatisfactory because of their rough handling of the eggs. For these and many other reasons which are well known to those skilled in this art, it is apparent that prior art egg cleaning machines and methods have not satisfactorily solved the problems encountered in this art.

Accordingly, it is an object of the instant invention to provide a machine which will properly clean eggs.

It is also an object of this invention to provide a machine which will completely and properly wash and dry eggs.

A further object of this invention is to provide an egg washing and drying machine which is completely automatic in operation.

In addition, an object of this invention is to provide an egg washing and drying machine having means automatically feeding eggs to be cleaned into the machine and means automatically removing cleaned eggs from the machine.

It is another object of this invention to provide an egg washing and drying machine which is automatic in operation and which is relatively simple in construction, completely reliable in operation, and relatively inexpensive.

Another object of this invention is to provide an egg washing and drying machine in which there is maintained a slight vacuum whereby to properly dry the eggs and prevent spoilage thereof.

In addition, it is an object of the instant invention to provide an egg washing and drying machine which operates with an absolute minimum of breakage.

The aforesaid and other objects will become clearly apparent upon reading the following detailed description, taken together with the accompanying drawings wherein like reference numerals represent like parts and wherein:

Fig. 1 is a view in side elevation of the washing side of the machine of the instant invention, with the cover member in raised position and with certain parts broken away for greater clarity;

Fig. 2 is a plan view of the machine with the cover member removed and taken along line II—II of Fig. 1;

Fig. 3 is a transverse sectional view of one end of the machine, showing the feed and discharge mechanisms thereof;

Fig. 4 is a detail view taken along line IV—IV of Fig. 3 and showing the egg feeding mechanism of the machine;

Fig. 5 is a transverse sectional view of the other end of the machine, showing the mechanism for transferring eggs from the washing to the drying side thereof;

Fig. 6 is a detail view taken along line VI—VI of Fig. 5, and showing the egg transfer mechanism in detail;

Figure 9:
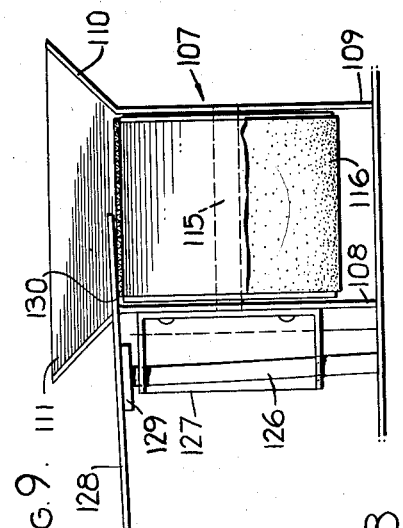
Fig. 9 is an end view of the conveyor assembly of Fig. 8.

The instant invention comprises a housing having a washing area or compartment A and a drying area or compartment B, together with means for conveying a series of eggs first through said washing compartment and then through said drying compartment, and with means for maintaining a partial vacuum within said housing whereby to increase the drying effect. Further, the washing and drying compartments are preferably arranged in side-by-side relation, as illustrated, whereby to render the machine more convenient to handle.

Thus, there is provided a base member 1 carried by longitudinally extending brackets 1 and provided with upstanding side walls, and longitudinally spaced upstanding wall members 2 and 3 are secured to said base member in any conventional manner, as by means of rivets or the like, whereby to provide end walls. A drive housing 4 provided with a removable cover plate 5 is arranged adjacent end wall 3, and an electric motor 6 is mounted on a plate 6' carried by brackets 1' for driving the machine in a manner to be described. Another wall member 7 rests on base member 1 and extends longitudinally between end walls 2 and 3, serving to divide the machine into the two areas or compartments A and B.

A cover member 8, of inverter U-shape in cross section, is hingedly connected to end wall 2 adjacent the top thereof as by means of hinge members 9, and an articulated brace member 10 extends from said cover member 8 to wall 7, whereby said cover member may be uplifted and will remain locked in raised position, as indicated in Fig. 1, until said articulated brace member 10 is bent adjacent its pivot 10' whereby to permit lowering of said cover member. As is apparent from an inspection of Fig. 1, cover member 8 is provided with a top wall and with two depending side walls, whereby when the same is lowered it cooperates with base member 1 and end walls 2 and 3 to provide a substantially enclosed housing for the washing and drying apparatus, which apparatus includes means for creating a partial vacuum in said housing as will be more fully described hereinafter.

Washing compartment A is provided with an egg conveyor assembly generally designated at 11, which assembly is seen to comprise a roll 12 formed of lightweight metal or the like and mounted on shaft means 13, which shaft means are journaled in end walls 2 and 3 by self-alining bearings 14 and are secured in place by collar and set screw assemblies 15. A strip 16 of material such as rubber stock and formed with a raised boss 17 and a slender flange 17' extending along said boss 17 intermediate the opposite side edges thereof is wrapped around roll 12 to extend spirally therealong.

A front rod-like guide member 18 extends lengthwise of roll 12 and adjacent thereto, being secured at one end to end wall 3, and at its other end to end wall 2. A bracket means 19 extends from end wall 2 for a purpose to be described. Similarly, a rear guide assembly comprising a rod-like member 20 is arranged adjacent conveyor 11 to extend longitudinally thereof, and is connected to end walls 2 and 3 by any conventional means. Guide members 18 and 20 are so spaced and arranged adjacent conveyor 11 as to provide a guide for an egg or eggs being conveyed by spiral boss 17.

Washing compartment A is also provided with a brush member 21 composed of spirally arranged bristles, preferably of material such as nylon and in this instance approximately .018 inch in diameter. Brush 21 is carried by shaft means 22, being secured thereon by collar and set screw assemblies 23, and said shaft means is journaled in end walls 2 and 3 in self-alining bearings 24 and secured in place by collar and set screw means 24'. Brush 21 is arranged so that the bristles thereof come into brushing contact with an egg being conveyed through the washing compartment, as will become more apparent from the subsequent description of the operation of this machine.

Drying compartment B is also provided with a spiral conveyor assembly generally designated 25 comprising a roll 26 of metal or the like, and a strip 27 of material such as rubber stock, having a raised boss 28 thereon with a flange 29 extending along said boss intermediate the side edge portions thereof, is wrapped around roll 26 to extend spirally therealong. Roll 26 is mounted on shaft means 30, with shaft means 30 being journaled in self-alining bearings in end walls 2 and 3 in the same manner as shaft means 13. Thus, identical conveyors are provided in washing compartment A and drying compartment B.

Front and rear guide members, comprising rods 31 and 32, respectively, are arranged adjacent conveyor 25 to extend longitudinally thereof, being secured in end walls 2 and 3 by any conventional means. As in the case of washing compartment A, the front and rear guide members are arranged to guide an egg being conveyed along boss 28.

A drying brush 33 is arranged above conveyor 25, being secured on shaft means 34 by collar and set screw assemblies 35, and being journaled in self-alining bearings 36 in end walls 2 and 3 and secured in place by collar and set screw assemblies 36'. Brush 33 is arranged to brush against an egg being conveyed through drying compartment B, and is preferably formed of nylon bristles arranged in spiral form and having a diameter of approximately .008 of an inch.

A water pipe 37, having openings 38 therein forming jets for the outward passage of washing fluid such as water therefrom, is arranged in washing compartment A at a point adjacent conveyor 11 and extending therealong so that jets of water will shoot toward an egg being conveyed in an almost horizontal flow just clearing the underside of guide 18. Pipe 37, which is closed at its inner end, is clamped at its inner end to guide 18 by a clamp 39, and extends at its outer end through a fitting 40 in end wall 3 to an L pipe 41 adapted for connection to a source of supply. A needle valve (not illustrated) may be provided in pipe 41 adjacent the machine for easy adjustment of water flow. For best egg washing results, it is preferable that the water be scalding hot and at a temperature of at least 165° F.

Conveyor means 11 and 25, and brushes 21 and 33, are rotatably driven by motor 6 in the following manner. Motor 6 is provided with a drive shaft 42 extending into driving housing 4, and a two-step pulley 64 is carried thereby, as shown in Fig. 2. A pulley 65 is carried by shaft 34 of brush 33, and a belt 66 extends between pulleys 64 and 65, whereby shaft 34 and brush 33 are driven from drive shaft 42. A second pulley 54 is also carried by shaft 34, and a pulley 53 is carried by shaft 22 of brush 21. A belt 55 extends between pulleys 53 and 54, whereby pulley 53 is driven from shaft 34. A second pulley 51 is carried by shaft 22, and a pulley 43 is journaled on a shaft 44 carried by end wall 3 with a sleeve bearing 45 between said pulley and said shaft.

A belt 52 extends between pulleys 51 and 43, whereby pulley 43 is driven from shaft 22.

A pinion 46 is carried by shaft 44 and keyed to pulley 43, and said pinion meshes with a gear 46' carried by a second shaft 47 extending from end wall 3, with a sleeve bearing 48 fitting between shaft 47 and gear 46'. Conveyor shafts 13 and 30 extend through end wall 3 and carry gears 49 and 50, respectively, which gears mesh with gear 46', whereby said gears 49 and 50 and consequently conveyors 11 and 25, are driven from pulley 43.

A switch mechanism 56, adapted for manual on-off operation, is carried on top of drive housing 4, and is connected to motor 6 through wiring 57, whereby an operator may readily start and stop the machine.

Thus, the machine is driven as follows. Switch 56 is actuated to start motor 6, whereupon drive shaft 42 drives two-step pulley 64. Brush 33 is driven from pulley 64 through belt 66, pulley 65, and shaft 34, and brush 21 is driven from shaft 34 through pulley 54, belt 55, pulley 53, and shaft 22. Conveyor assemblies 11 and 25 are driven from shaft 22 through pulley 51, belt 52, pulley 43, pinion 46, gear 46', and gears 49 and 50 and shafts 13 and 30, respectively. Preferably, the arrangement is such that conveyors 11 and 25 are each driven at 25 revolutions per minute, whereby 1500 eggs per hour will be processed through the machine, and the drive is preferably arranged so that brush 21 is driven at 225 revolutions per minute and brush 33 is driven at 550 revolutions per minute. Motor 6 may be as small as ¼ horse power.

Figure 7:
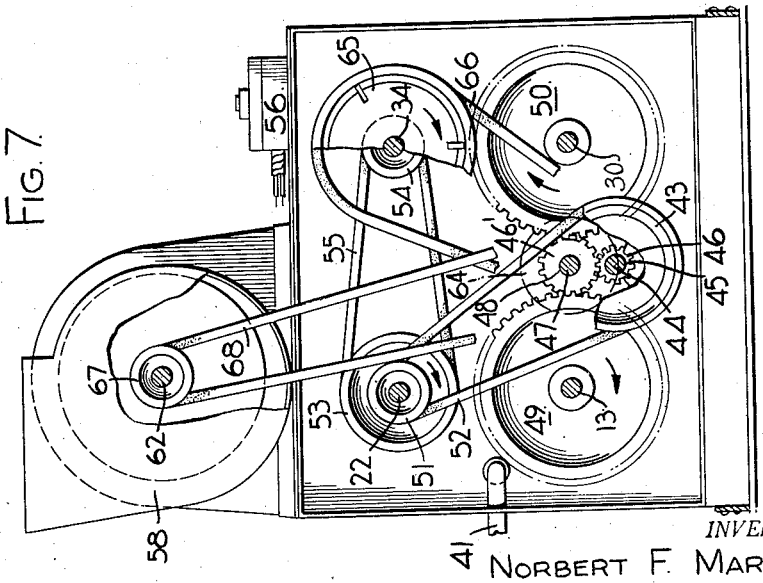
Fig. 7 is an end view showing the drive arrangement of the machine.

Also, it will be noted that the drive is so arranged that brushes 21 and 33 and conveyors 25 and 11 rotate in the direction of the arrows in Fig. 7. In this way, eggs being conveyed through washing compartment A are caused to ride against and along front guide member 18, while eggs passing through drying compartment B are caused to ride along and against rear guide member 32. Thus, eggs passing through the washing compartment are directly exposed to the action of the washing fluid, and also the eggs will be caused to aline themselves longitudinally of the conveyors in a manner to be more fully described hereinafter.

Also, it has been found that the washing and drying effect of the machine is measurably increased when the cleaning operation is performed under a slight vacuum. As is well known, eggs will spoil if water is allowed to seep through the shell thereof, and therefore it is important that the water applied to the egg shell be removed therefrom and that the eggs be dried as quickly as possible. To this end, means are provided for maintaining a slight vacuum in the machine when cover member 8 is in closed position, and such means are shown to comprise a fan 58 mounted on the top of the machine adjacent end wall 3 and having an intake 59 and an exhaust 60. Fan 58 is of the centrifugal type, and includes a blower wheel 61 carried by a shaft 62 suitably journaled in the walls of the fan housing as by means of bearings 63, which bearings may be self-alining. Since wall 7 has certain openings therein, as will become apparent hereinafter, and since cover member 8 fits over base member 1 with a substantial sealing effect, a satisfactory degree of vacuum can be maintained in the housing.

Blower wheel 61 is driven from motor 6 in the following manner. A pulley 67 is carried by shaft 62 of blower wheel 61, and a belt 68 extends between pulley 67 and two-step pulley 64. In this way, blower wheel 61 is driven from motor 6 through drive shaft 42, pulley 64, belt 68, pulley 67, and shaft 62. These various pulleys, including the two-step pulley 64, are arranged so that blower wheel 61 produces a vacuum equaling approximately 1½ inches water column within the machine when enclosed, such vacuum or suction being produced in both washing and drying compartments A and B.

In addition, means are provided for automatically feeding eggs onto the washing compartment conveyor, transferring eggs from the washing compartment conveyor to the drying compartment conveyor, and for discharging eggs from the drying compartment conveyor onto a conveyor assembly, which means will now be described. It will be observed, from the representation in Fig. 4, that the eggs E are intended to ride on adjacent edge portions of succeeding convolutions of the boss 17, thus generally being supported above the inner portions 16 of conveyor 11 and spaced between flanges 17'. Obviously, means must be provided for delivering eggs to conveyor 11 in proper sequence so that the eggs will assume the proper position on conveyor 11. The feed mechanism is best seen in Figs. 3 and 4, and is seen to comprise an inlet track 69 having a base portion and diverging upstanding side walls 70, together with a rubber trackway 71 substantially U-shaped in cross section extending along the base of said track 69. Front guide 18 drops downwardly at this point, to permit eggs to pass onto conveyor 11, and track 69 is detachably fixed to brackets 19 and front guide 18 by bracket means 72, whereby the same may readily be assembled and disassembled.

A bracket 73 is pivoted to rear guide 20, and carries at its outer upper end portion a bumper arm 75. A second and longer bracket 76 is also pivoted to rear guide 20 and carries at its outer upper end a retaining arm 77 provided with a rubber sleeve 78. It will be noted that arm 75 is bent inwardly toward end wall 2 whereby to extend beyond each side of bracket 73, and bracket 76 rests upon the inner extension of said arm 75 as illustrated in Fig. 4, whereupon bracket 76 will rise or move with bracket 73. Also, a cam-shaped member 79 is carried by shaft 13 to rotate therewith, and a cam follower 80 carried by bracket 73 rides upon said cam member 79. When in normal position, as illustrated in Fig. 3, the eggs arranged on inlet track 69 rest against bumper arm 75 and arm 77 is raised. Cam track member 79 is arranged so that with each revolution of conveyor 11, and when the spiral track formed by boss 17 is alined with inlet track 69, follower 80 causes bracket 73 to drop thereby permitting the innermost egg to roll onto conveyor 11. At the same time, bracket 76 is lowered whereby to prevent forward movement of the remainder of the eggs on track 69. Bumper arm 75 is then raised to egg engaging position by cam 79 and follower 80 and arm 77 is raised out of the path of the eggs, permitting the eggs to move along track 69 to arm 75, whereupon the action is completed. It is noted that track 69 is downwardly inclined so that the eggs move therealong under the influence of gravity. In this way, one egg is delivered to the machine during each revolution of conveyor 11, and of course by the succeeding revolution the first-delivered egg will have moved beyond the point of feed a sufficient distance to permit the feeding to the conveyor of a second egg, as illustrated in Fig. 4.

In addition, bumper 81 is secured to a bracket 81' carried by rear guide 20 with a spring biased pivot 82, and extends downwardly into the path of an egg being delivered from inlet track 69 to conveyor 11. Bumper 81 is so arranged and is of such strength as to provide a bumper means for an egg being delivered to the conveyor, readily deflecting toward wall 7 whereby to permit the egg to roll onto conveyor 11 but preventing the egg from bumping against rear guide 20 and biasing the egg toward front guide 18 to prevent it from breaking thereagainst under the action of brush 21.

Thus, eggs are automatically fed to the machine one at a time and in proper sequence, and are carried along conveyor 11 in the manner shown in Fig. 4. It will be noted that by reason of the direction of rotation of brush 21, its action will cause the egg to bear against guide member 18 and aline itself longitudinally therealong and along conveyor 11. This self-alining action of the eggs occurs shortly after they are delivered to the conveyor, and greatly aids in accomplishing a complete washing action thereon and in reducing breakage thereof.

As the eggs reach the end of conveyor 11, means are provided for automatically transferring them from the washing compartment A to the drying compartment B, which transfer means are best shown in Figs. 5 and 6. Wall 7 has an opening 83 therein at the drive ends of conveyors 11 and 25, and a transfer track 84, provided with a base portion and upstanding diverging side walls 85, is detachably mounted on guide members 20 and 32 by bracket means 86. Guide 20 is depressed at this point to permit an egg to pass thereover. A rubber track member 88, which is substantially U-shaped in cross section, extends along the base portion of track 84.

A series of transfer pusher pins 89 are mounted on conveyor 11 at the end portion thereof so as to extend vertically upward at the point where the track formed by adjacent convolutions of boss 17 is alined with track 84. At this point, the egg to be transferred will be alined with transfer track 84 and pusher pins 89 will bear against the egg and force it onto the tranfer track.

Also, a cam track member 90 is carried by shaft 13, and a bracket 91 having a cam follower 92 thereon is pivoted to end wall 3 by a pivot shaft 93. Follower 92 follows cam track 90, and a spring member 94 is secured to shaft 93 and bears against the upper portion of follower 92, whereby to bias bracket 91 for movement in a clockwise direction about pivot 93. A paddle member 95 is carried by an L-shaped arm 96 to extend in alinement with transfer track 84, and arm 96 is secured to a pivot shaft 97 carried by end wall 3. A bracket member 98 is also carried by shaft 97, and is secured to arm 96 for pivoting the latter about shaft 97. An arm 99 extends from the outer end of bracket 91 to the outer end of bracket 98.

Thus, cam track 90 is arranged so that in its movement with shaft 13 as soon as pusher pins 89 have pushed the egg onto transfer track 84 said cam track will cause follower 92 to move bracket 91 upwardly, which action is transferred through arm 99, bracket 98, and arm 96 to cause paddle 95 to pivot in a clockwise direction about shaft 97 and engage the egg and move the same along transfer track 84 over to the conveyor 25 in drying compartment B. Once the egg has been delivered to conveyor 25, the cam permits bracket 91 to drop under the influence of spring 94, and paddle member 95 once again swings out of the way. Of course, conveyor 25 is so arranged that the track formed by boss member 28 will be alined with track 84 to receive the egg.

A bumper 100 is pivoted to a bracket member 100' carried by guide member 31 with a spring connection 101, and extends downwardly into the path of an egg being received by conveyor 25, serving to prevent the egg from hitting guide 31 and bias the egg against guide 32 so that brush 33 will not smash the same thereagainst. Thus, with each revolution of the conveyor 11, an egg will be delivered thereby onto track 84 and will be moved by paddle 95 over to conveyor 25, which conveyor is driven at the same speed as conveyor 11 and has its spiral boss portion synchronized therewith so as to be in the proper position to receive the eggs being delivered thereto. It is noted that track 84 is inclined downwardly toward washing compartment A, whereby any water thereon will drain into washing compartment A and whereby to prevent any uncontrolled motion of the egg therealong.

The egg is then carried along conveyor 25, bearing against inner guide 32 by reason of the direction of rotation of brush 33, until it is received at the discharge end of the machine. Since the enclosed machine is kept under a slight vacuum, the drying action is enhanced, and as previously stated the drying brush 33 rotates at twice the speed of the washing brush, whereby a complete and satisfactory drying of the eggs is secured. Thus, conveyor 25 causes the egg to travel through drying compartment B, in the same way as conveyor 11 caused the egg to travel through washing compartment A, and the action of brush 33 tends to cause the egg to aline itself longitudinally along guide member 32 and acts to brush dry the egg passing through said drying compartment. At the end of said drying compartment remote from the drive end, and directly opposite the feed assembly mechanism, is the egg discharge mechanism, which discharge mechanism is most clearly shown in Figs. 2 and 3.

Thus, at the end wall 2 of the machine, there is provided a bracket 102, and an outlet track 102' having upwardly diverging side walls 103 is detachably mounted thereon by bracket means 103'. Also, there is carried by conveyor 25, at the exact point where an egg thereon is alined with outlet track 102', a pusher member 104, which pusher member bears against an egg ready for discharge and pushes the same onto said outlet track. It will be noted that front guide member 31 is bent upwardly at this point to provide clearance for the passage thereunder of the egg being discharged. A track member 105 is arranged in outlet track 102', and is upwardly inclined toward conveyor 25 to provide an incline from the top of conveyor 25 to the discharge end of outlet track 102', as clearly illustrated in Fig. 3, and this track member is preferably formed of stainless steel rods or the like. Also, a guide member 106, secured to rear guide 32, is arranged to form a guide for eggs being discharged, whereby to prevent the same from abutting said end wall. Thus, when the machine is functioning, with each revolution of conveyor 25 an egg is brought into alinement with outlet track 102', and pusher member 104 bears thereagainst to push the same onto incline track 105 for passage to the outlet of track 102'.

Figure 8:
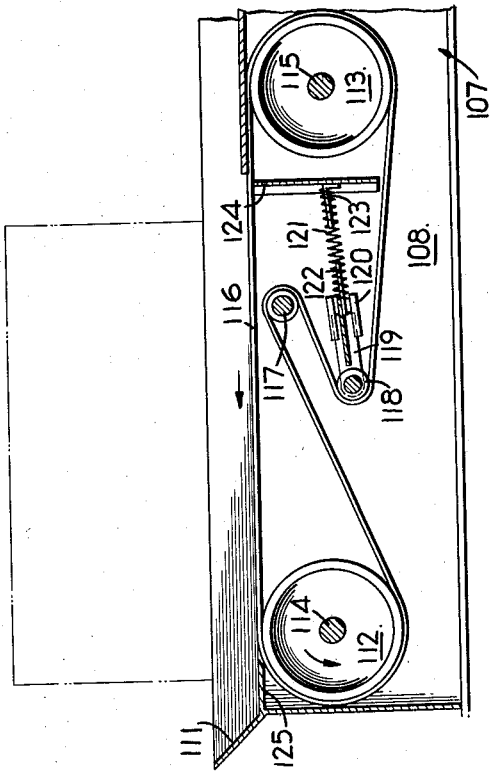
Fig. 8 is a longitudinal sectional view of the conveyor assembly for receiving eggs as they are discharged from the machine.

In addition, there is provided a conveyor assembly for removing the cleaned and dried eggs away from the discharge outlet of the machine and for storing the same adjacent the point at which eggs are fed into the machine until they are removed by the operator, such conveyor means being shown particularly in Figs. 8 and 9.

This discharge conveyor assembly is generally designated 107, and is seen to comprise a structure having side walls 108 and 109 adapted to rest on brackets 1'. Conveyor 107 extends along end wall 2 in a direction transverse to the longitudinal axis of the machine, and is provided with an upwardly and outwardly diverging wall means 110 open adjacent the receiving end of said conveyor which is adjacent the discharge end of the machine, and extending along walls 108 and 109 to the opposite end of said conveyor where the same is provided with an upwardly and outwardly diverging end wall portion 111. Relatively large idler pulleys 112 and 113 are journaled on shaft means 114 and 115, respectively, carried by the opposite side walls of conveyor 107. Pulleys 112 and 113 are arranged at opposite ends of said conveyor, and a web belt 116 extends around said pulleys in line with the bottom edge portions of wall members 110 and 111.

The drive shaft 30 of conveyor 25 extends through end wall 2 and through an opening in the side of wall 108, with its end within said conveyor 107 having a rubber or similar sleeve 117 thereon to provide a friction surface. It will be noted that shaft 30 is located intermediate pulley 112 and 113, and web belt 116 extends around sleeve 117 in driven relation with shaft 30. Also, a take-up means is provided in the form of an idler pulley 118 carried by bracket means 119 slidably mounted in guide means 120 carried by wall 108. A spring 121 is secured at one end around an extension 122 of bracket 119, and at its other end to a flange 123 carried by a bracket 124 mounted on wall 108. Web belt 116 also extends around pulley 118, whereby the bias of spring 121 causes pulley 118 to take up any slack in web belt 116 and maintain proper tension therein. Thus, web belt 116 is driven from shaft 30 in the direction of the arrow to convey eggs delivered thereon toward the end wall 111 of conveyor assembly 107. In addition, closely adjacent the point where web belt 116 wraps around pulley 112, there is provided a horizontal shelf portion 125 for receiving eggs from said web belting.

The means for delivering eggs from outlet track 102' onto conveyor 116 are as follows. An upstanding shaft 126 is rotatably journaled at spaced points in a bracket 127 mounted on wall 108 by any appropriate means. Shaft 126 is located adjacent the outer end of outlet track 102', and supports a circular plate 128 at the top thereof, as by means of a boss 129. It will be noted from Figs. 2 and 3 that plate 128 is arranged to pass under outlet track 102', being passed completely thereunder adjacent the outlet thereof, and in addition overlaps the receiving end portion of web belt 116. Further, it will be noted, and particularly from Fig. 9, that shaft 126 is inclined slightly from the vertical, whereby web belt 116 contacts plate 128 only at point 130, which point is adjacent the center of said plate. Thus, web belt 116 drives plate 128, rotating the same about shaft 126, and does so with a point contact spaced a relatively slight distance radially outward of the center of said plate, whereupon said plate is driven at a relatively fast speed and eggs are moved thereby to web belt 116 faster than they are discharged from the machine. In addition, an arcuate guard rail 131 extends from the inner edge of outlet track 102' around the periphery of plate 128 and over to wall portion 110. Obviously, the speed of plate 128 can be varied by varying the inclination of shaft 126 from the vertical.

Thus, as an egg rolls down inclined track 105 it passes from outlet track 102' onto plate 128 which rotates the same in the direction of the arrow in Fig. 2 over onto web 116, guide rail 131 serving to prevent the egg from dropping off said outlet plate. The centrifugal force introduced by the rotation of plate 128 serves to maintain the egg against guide rail 131, and thus the same is passed by plate 128 onto web belt 116, which latter in turn conveys the same in the direction of the arrow until it contacts end wall 111. Subsequent eggs will be conveyed from the discharge outlet of the machine in an identical manner, and the eggs will pile up along web belt 116. Obviously, the speed of web belt 116 is sufficiently low so that there is no danger of breakage or the like, and a group of piled up eggs will readily withstand the moving force of belt 116. Thus, the operator need only periodically remove said eggs from discharge conveyor assembly 107, and the cleaned eggs are automatically conveyed to the inlet end of the machine whereby a single operator can readily feed eggs to be cleaned into the machine and remove cleaned eggs therefrom.

It is believed that the operation of this machine is now obvious to one skilled in the art. The operator need merely arrange a series of eggs to be cleaned on inlet track 69. If desired, larger or more continuous feeding means such as a belt conveyor similar to that illustrated at 107 could be used for supplying eggs to the feeding mechanism of the machine, in which case plate 128 would simply be placed at the other end of conveyor 107. Switch 56 is turned on to energize motor 6, and the conveyors and brushes together with the fan blower wheel are thus operated and begin to rotate. Also, the supply of water is turned on and jets of water are thus caused to issue from openings 38 in water pipe 37.

The eggs on inlet track 69 are automatically fed into conveyor 11 by the feed mechanism including bumper arm 75 and restraining arm 77, whereby one egg is delivered onto the conveyor with each revolution thereof, and the conveyor is arranged so as to be properly alined to receive an egg from inlet track 69. The eggs are carried by opposing edge portions of adjacent convolutions of boss 17, being supported thereby as clearly shown in Fig. 4, and by reason of the action of brush 21 quickly aline themselves longitudinally of conveyor 11 along guide member 18. The eggs thus pass along the length of conveyor 11, bearing against guide member 18, and are thoroughly washed by the jets issuing from water pipe 37 and scrubbed by brush 21.

As they reach the opposite end of conveyor 11, each egg in turn is pushed onto transfer track 84 by pusher pins 89 and pushed along said track by paddle 95 until it is deposited on conveyor 25, the spiral track of each conveyor being arranged so that it is properly alined with the transfer track member.

The egg then passes along conveyor 25, alining itself longitudinally thereof along guide 32 in a manner identical with that illustrated in Fig. 4, and brush 33 brushes the egg dry. At the same time, fan 58 creates a slight suction effect or vacuum within the enclosed machine, aiding the drying action.

As the eggs reach the discharge end of the machine, they are pushed onto track 105 by pusher member 104, and are received by plate 128 and transferred thereby over to web belt 116 on conveyor 107. The eggs pass along said web belt 116 to the opposite end of said conveyor, and are automatically stored adjacent said end. Thus, the operator of the machine need only maintain a proper supply of eggs into the feed mechanism, and periodically remove the eggs from the discharge conveyor assembly, and can do so with a minimum of effort. In practice, with the machine of this invention it has been found that the eggs are thoroughly washed and thoroughly dried without spoilage thereof, and with an absolute minimum of breakage.

Also, there is provided a drain 131 in the bottom of washing compartment A, and wall 7 has an opening 132 therein adjacent drain 131, whereby the machine can readily be drained by simply tilting the same.

Therefore, it is clearly apparent that the instant invention has fully accomplished its aforesaid objects, and has provided an egg washing and drying machine which is satisfactory in every respect. While a preferred embodiment of this machine has been disclosed and illustrated in detail, it is to be understood that the invention is not limited thereto, but can comprehend various chanegs therein without departing from the inventive concept. Therefore, it is intended that the invention be limited only by the appended claims.

Having completely described and fully disclosed my invention, what I claim as new is as follows:

1. An egg cleaning machine comprising, housing means, conveyor means positioned within said housing means for conveying eggs therethrough and including a rotatable spiral track of resilient material providing a friction surface, guide means extending along said conveyor means for guiding an egg therealong, rotary scrubbing brush means positioned above said conveyor means for scrubbing eggs being conveyed therealong, means for rotating said conveyor means and said scrubbing brush means with the latter rotating faster than the former and in a direction urging the eggs against said guide means, feed means synchronized with said conveyor means for automatically feeding eggs to said conveyor means in timed relation, said feed means including track means extending substantially laterally of said conveyor means on the guide means side thereof, said brush means being positioned to avoid interference with eggs being discharged from said feed track means, and pivoted bumper means positioned adjacent the discharge end of said feed track means for receiving eggs passing therefrom onto said conveyor means and biasing the same toward said guide means before being acted upon by said brush means.

2. In an egg cleaning machine, conveyor means comprising track means having a raised portion of resilient material providing a friction surface, said raised portion having opposite side edge portions defining an egg supporting track of spiral form extending along said conveyor means with the adjacent side edge portions of adjacent convolutions of said raised portion being spaced from each other and from the conveyor part therebetween a distance sufficient generally to support an egg at spaced points adjacent the opposite ends thereof and cradle the same in longitudinal alignment with said conveyor means free of such conveyor part, means mounting said conveyor means for rotation of said track about a first axis, guide means extending along said track above and to one side of said first axis in substantial parallelism therewith, scrubbing means comprising bristle brush means arranged above said conveyor means for scrubbing contact with eggs on said track, means mounting said scrubbing brush means for rotation about a second axis above and in substantial parallelism with both said guide means and said first axis and positioned on the same side of said guide means as said first axis, drive means for rotating said conveyor track and said scrubbing brush means in the same direction about their respective axes with said conveyor track engaging an egg thereon at such spaced points with greater friction than said scrubbing brush means and rotating such eggs and with said scrubbing brush means rotating faster than said conveyor track to scrub the rotating eggs and in a direction holding the same against said guide means against the counter tendency of the rotating conveyor means, whereby eggs on said track are scrubbed and are rotated in substantially longitudinal alignment with said guide means as they are conveyed therealong.

3. An egg cleaning machine as set forth in claim 2, together with means for applying washing fluid to eggs being conveyed on said track comprising elongated fluid conduit means extending along said conveyor means on the same side of said first axis as said guide means and in substantial parallelism therewith, said conduit means being positioned closely adjacent said guide means so as to be adjacent the level of eggs on said track and having multiple fluid outlets directed to discharge washing fluid generally laterally inwardly onto such eggs.

4. In an egg cleaning machine, housing means providing a washing area and a drying area, first rotary conveyor means having a spiral track positioned in said washing area for conveying eggs therethrough, second rotary conveyor means having a spiral track positioned in said drying area for conveying eggs therethrough, means for rotating said first and second conveyor means in synchronism with each other, means for washing eggs being conveyed through said washing area, means for drying eggs being conveyed through said drying area, egg feeding means at one end of said first conveyor means, egg discharge means at one end of said second conveyor means, and egg transfer means for transferring eggs from said washing area to said drying area, said transfer means including track means extending between said first and second conveyor means adjacent the other ends thereof and inclining upwardly from said washing area to said drying area, first pusher means carried by said first conveyor means for pushing an egg from said first conveyor means onto said transfer track means when the spiral track of the former is in registry with the latter, and second pusher means synchronized with said first and second conveyor means for pushing an egg upwardly along said transfer track means and onto said second conveyor means when the spiral track of the latter is in registry with the former.

5. In an egg cleaning machine, housing means providing a washing area and a drying area positioned in side by side relation, first rotary conveyor means having a spiral track positioned in said washing area for conveying eggs therethrough, second rotary conveyor means having a spiral track positioned in said drying area for conveying eggs therethrough, means for rotating said first and second conveyor means in synchronism with each other, means for washing eggs being conveyed through said washing area, means for drying eggs being conveyed through said drying area, egg feeding means at one end of said first conveyor means, egg discharge means at the adjacent end of said second conveyor means, and egg transfer means for transferring eggs from said washing area to said drying area, said transfer means including track means extending between said first and second conveyor means adjacent the other ends thereof and inclining upwardly from said washing area to said drying area, first pusher means carried by said first conveyor means for pushing an egg from said first conveyor means onto said transfer track means when the spiral track of the former is in registry with the latter, and second pusher means synchronized with said first and second conveyor means for pushing an egg upwardly along said transfer track means and onto said second conveyor means when the spiral track of the latter is in registry with the former.

6. In an egg cleaning machine, means defining a housing having a washing area and a drying area, first rotary conveyor means having a spiral track in said washing area for conveying an egg to be cleaned therethrough, second rotary conveyor means having a spiral track in said drying area for conveying a washed egg therethrough, means for washing an egg being conveyed through said washing area, means for drying an egg being conveyed through said drying area, transfer means including transfer track means extending between and arranged for registry with the spiral tracks of said two conveyor means for transferring an egg from said washing area to said drying area, said transfer means including first pusher means carried by said first conveyor means in a position to move an egg from said first conveyor means onto said transfer track means when the spiral track of said first conveyor means is in registry with said transfer track means, and second pusher means operable to move an egg along said transfer track means and onto said second conveyor means when the spiral track thereof is in registry with said transfer track means, said first and second conveyor means being rotated in synchronism and said second pusher means comprising cam actuated means operated in synchronism with said conveyor means.

7. In an egg cleaning machine, means defining a housing having a washing area and a drying area, first rotary conveyor means having a spiral track in said washing area for conveying an egg to be cleaned therethrough, second rotary conveyor means having a spiral track in said drying area for conveying a washed egg therethrough, means for washing an egg being conveyed through said washing area, means for drying an egg being conveyed through said drying area, transfer means including transfer track means extending between and arranged for registry with the spiral track of said two conveyor means for transferring an egg from said washing area to said drying area, said transfer means including first pusher means carried by said first conveyor means in a position to move an egg from said first conveyor means onto said transfer track means when the spiral track of said first conveyor means is in registry with said transfer track means, and second pusher means operable to move an egg along said transfer track means and onto said second conveyor means when the spiral track thereof is in registry with said transfer track means, said first and second conveyor means being rotated in synchronism, together with a cam member rotated in synchronism with said conveyor means and a cam follower engaging said cam member and connected to said second pusher means for actuating the same.

8. In an egg cleaning machine, housing means, first conveyor means positioned within said housing means for conveying eggs therethrough, means within said housing means for cleaning eggs being conveyed therethrough, feed means adjacent one end of said conveyor means for feeding eggs thereto, discharge means adjacent the other end of said conveyor means for discharging cleaned eggs therefrom to the exterior of said housing means, second conveyor means positioned exteriorly of said housing means and comprising endless belt means, wall means positioned adjacent one end of said endless belt means for receiving eggs thereagainst and retaining the same on said endless belt means, means for driving said first and second conveyor means, rotary transfer plate means extending between the other end of said belt means and said discharge means, said transfer plate means having a point contact with said belt means for being rotated thereby, and guide means associated with said transfer plate means for retaining eggs on said plate means as they are transferred thereby from said discharge means to said endless belt means.

9. An egg cleaning machine as set forth in claim 8, wherein said second conveyor means extends from said discharge means to a point adjacent said feed means and wherein said wall means is positioned adjacent said feed means, whereby the cleaned eggs will be delivered by said second conveyor means for collection at a point adjacent said feed means.

10. In an egg cleaning machine, housing means providing a substantially enclosed egg washing compartment, conveyor means positioned within said washing compartment for conveying eggs therethrough, means including a feed opening in said housing means for passing eggs to be cleaned to said conveyor means, means including discharge opening means for receiving cleaned eggs from said conveyor means for removal from said compartment, means for applying washing fluid to eggs being conveyed through said compartment, and exhaust means operable to maintain a partial vacuum approximating one and one-half inches water column in said compartment whereby eggs are washed therein at less than ambient atmospheric pressure.

11. In an egg cleaning machine, housing means providing substantially enclosed washing and drying areas, conveyor means positioned within said housing means for conveying an egg first through said washing area and then through said drying area, means for feeding eggs to be cleaned into said washing area to said conveyor means, means for applying washing fluid to eggs being conveyed through said washing area, means for removing cleaned eggs from said conveyor means after they have passed through said drying area, and exhaust means opening into said washing area and therethrough into said drying area for partially evacuating both of said areas with said drying area being evacuated substantially only through said washing area, whereby both washing and drying are accomplished under subatmospheric pressure.

References Cited in the file of this patent

UNITED STATES PATENTS

| | | |
|---|---|---|
| 801,257 | Morral | Oct. 10, 1905 |
| 1,457,325 | Thatcher | June 5, 1923 |
| 1,491,489 | Mueller | Apr. 22, 1924 |
| 1,587,444 | Thomas | June 1, 1926 |
| 1,770,916 | Griffin | July 22, 1930 |
| 2,086,878 | Paxton | July 13, 1937 |
| 2,199,831 | Cunning | May 7, 1940 |
| 2,357,892 | Grant | Sept. 12, 1944 |
| 2,438,666 | Hodson | Mar. 30, 1948 |
| 2,501,367 | Wehmiller et al. | Mar. 21, 1950 |
| 2,574,252 | Dolson | Nov. 6, 1951 |
| 2,597,148 | Joseph | May 20, 1952 |
| 2,603,039 | Slocum et al. | July 15, 1952 |
| 2,627,140 | Marzolf | Feb. 3, 1953 |
| 2,628,376 | Scribner | Feb. 17, 1953 |
| 2,635,267 | Smith | Apr. 21, 1953 |

FOREIGN PATENTS

| | | |
|---|---|---|
| 26,721 | Great Britain | of 1909 |